US008546045B2

(12) United States Patent
Boucher et al.

(10) Patent No.: US 8,546,045 B2
(45) Date of Patent: Oct. 1, 2013

(54) GASKETED SUBASSEMBLY FOR USE IN FUEL CELLS INCLUDING REPLICATED STRUCTURES

(75) Inventors: Paul M. Boucher, Lake Elmo, MN (US); Michael A. Yandrasits, Hastings, MN (US); Katherine A. S. Graham, Roseville, MN (US); Eric J. Hanson, Hudson, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 2522 days.

(21) Appl. No.: 11/229,902

(22) Filed: Sep. 19, 2005

(65) Prior Publication Data
US 2007/0065705 A1   Mar. 22, 2007

(51) Int. Cl.
*H01M 2/14* (2006.01)
(52) U.S. Cl.
USPC ............ 429/508; 429/509; 429/510; 429/483
(58) Field of Classification Search
USPC .................................. 429/34, 35, 37, 30, 44
See application file for complete search history.

(56) References Cited

U.S. PATENT DOCUMENTS

| | | | |
|---|---|---|---|
| 3,320,092 A | 5/1967 | Uline | |
| 3,607,418 A | 9/1971 | Ortlieb | |
| 4,880,669 A | 11/1989 | Dorn et al. | |
| 5,187,025 A | 2/1993 | Kelland et al. | |
| 5,273,837 A | 12/1993 | Aitken et al. | |
| 5,441,621 A | 8/1995 | Molter et al. | |
| 5,510,069 A | 4/1996 | Schuppler et al. | |
| 6,057,054 A | 5/2000 | Barton et al. | |
| 6,080,503 A | 6/2000 | Schmid et al. | |
| 6,337,120 B1 | 1/2002 | Sasaki et al. | |
| 6,720,103 B1 | 4/2004 | Nagai | |
| 2003/0072986 A1 | 4/2003 | Kusakabe | |
| 2003/0104262 A1* | 6/2003 | Kuroki et al. ................... 429/36 |
| 2003/0194526 A1 | 10/2003 | Vesley et al. | |
| 2003/0211378 A1* | 11/2003 | Wald et al. ...................... 429/35 |
| 2004/0183055 A1 | 9/2004 | Chartier et al. | |
| 2004/0234831 A1 | 11/2004 | Kobayashi | |
| 2004/0241525 A1 | 12/2004 | Mekala et al. | |
| 2005/0031935 A1 | 2/2005 | Dave | |
| 2006/0131819 A1 | 6/2006 | Kurano et al. | |

FOREIGN PATENT DOCUMENTS

| | | |
|---|---|---|
| DE | 43 07 967 A1 | 9/1994 |
| JP | 08-148169 | 6/1996 |
| JP | 2003-163015 | 6/2003 |
| JP | 2004-319461 | 11/2004 |
| JP | 2005-525681 | 8/2005 |
| WO | WO 03/034515 A2 | 4/2003 |
| WO | 03/096455 | 11/2003 |
| WO | 2004/102721 | 11/2004 |
| WO | WO 2005/024279 | 3/2005 |

OTHER PUBLICATIONS

Stegink et al., U.S. Appl. No. 10/961,263, filed Oct. 8, 2004, now pending.

* cited by examiner

*Primary Examiner* — Raymond Alejandro
(74) *Attorney, Agent, or Firm* — Brian Morrison; Philip Y. Dahl

(57) ABSTRACT

An electrochemical device subassembly is provided that includes a membrane electrode assembly and a gasket. The membrane electrode assembly includes an electrolyte membrane having a first major surface, a second major surface opposite the first major surface, and a peripheral edge. The gasket is disposed adjacent the first major surface of the electrolyte membrane at the peripheral edge, and has a plurality of replicated structures that extend greater than about 250 micrometers from a surface of the gasket.

14 Claims, 9 Drawing Sheets

GASKETED SUBASSEMBLY FOR USE IN FUEL CELLS INCLUDING REPLICATED STRUCTURES

BACKGROUND OF THE INVENTION

Fuel cells are electrochemical devices that produce usable electricity by the catalyzed combination of a fuel such as hydrogen and an oxidant such as oxygen. In contrast to conventional power plants, such as internal combustion generators, fuel cells do not utilize combustion. As such, fuel cells produce little hazardous effluent. Fuel cells convert hydrogen fuel and oxygen directly into electricity, and can be operated at higher efficiencies compared to internal combustion generators. Because individual fuel cells do not produce much energy (e.g., between about 0.7-0.9 volts), multiple fuel cells may be arranged together in a stack to generate enough electricity to operate motor vehicles and supply electricity to remote locations.

A fuel cell, such as a proton exchange membrane (PEM) fuel cell, typically contains a membrane electrode assembly (MEA) formed by a catalyst coated membrane disposed between a pair of gas diffusion layers. The catalyst coated membrane itself typically includes an electrolyte membrane disposed between a pair of catalyst layers. The respective sides of the electrolyte membrane are referred to as an anode portion and a cathode portion. In a typical PEM fuel cell, hydrogen fuel is introduced into the anode portion, where the hydrogen reacts and separates into protons and electrons. The electrolyte membrane transports the protons to the cathode portion, while allowing a current of electrons to flow through an external circuit to the cathode portion to provide power. Oxygen is introduced into the cathode portion and reacts with the protons and electrons to form water and heat.

MEAs are typically sealed with gaskets to prevent pressurized gases from escaping. Seals are typically formed by compressing the gaskets and MEAs between electrode plates. However, a common problem with this method is that assemblers may over-compress the MEAs to ensure that the seals do not leak. Accordingly, over-compression may cause the anode portions and the cathode portions of the MEAs to contact through the respective electrolyte membranes, resulting in electrical shorts.

BRIEF SUMMARY OF THE INVENTION

The present invention is an electrochemical device subassembly that includes a MEA and a gasket. The MEA includes an electrolyte membrane having a first major surface, a second major surface opposite the first major surface, and a peripheral edge. The gasket is disposed adjacent the first major surface at the peripheral edge of the electrolyte membrane, and has a plurality of replicated structures that extend greater than about 250 micrometers from a surface of the gasket. The replicated structures allow the gasket to function as a seal to prevent pressurized gas from escaping the MEA during use, and also reduce the risk of over-compressing the MEA during manufacturing.

In one embodiment, the present invention may also include a second gasket disposed adjacent the second major surface at the peripheral edge of the electrolyte membrane. The second gasket may also have a plurality of replicated structures that extend greater than about 250 micrometers from a surface of the second gasket. The present invention further relates to a method of forming the subassembly and to an electrochemical device (e.g., a fuel cell) that includes the subassembly.

DETAILED DESCRIPTION

Figure 1A:
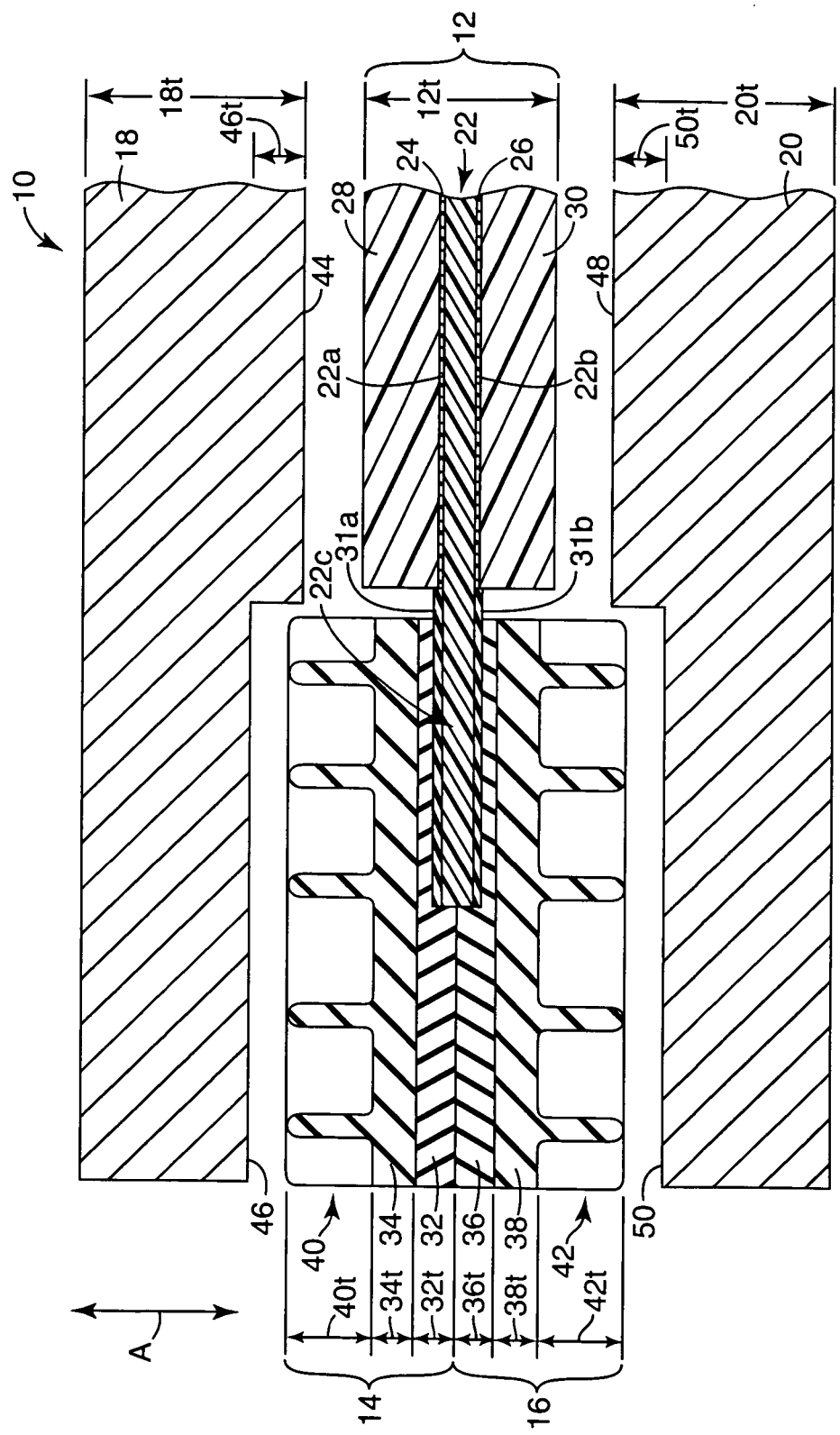
FIG. 1a is a sectional view of a peripheral portion of an electrochemical device subassembly of the present invention in an uncompressed state.
Figure 1B:
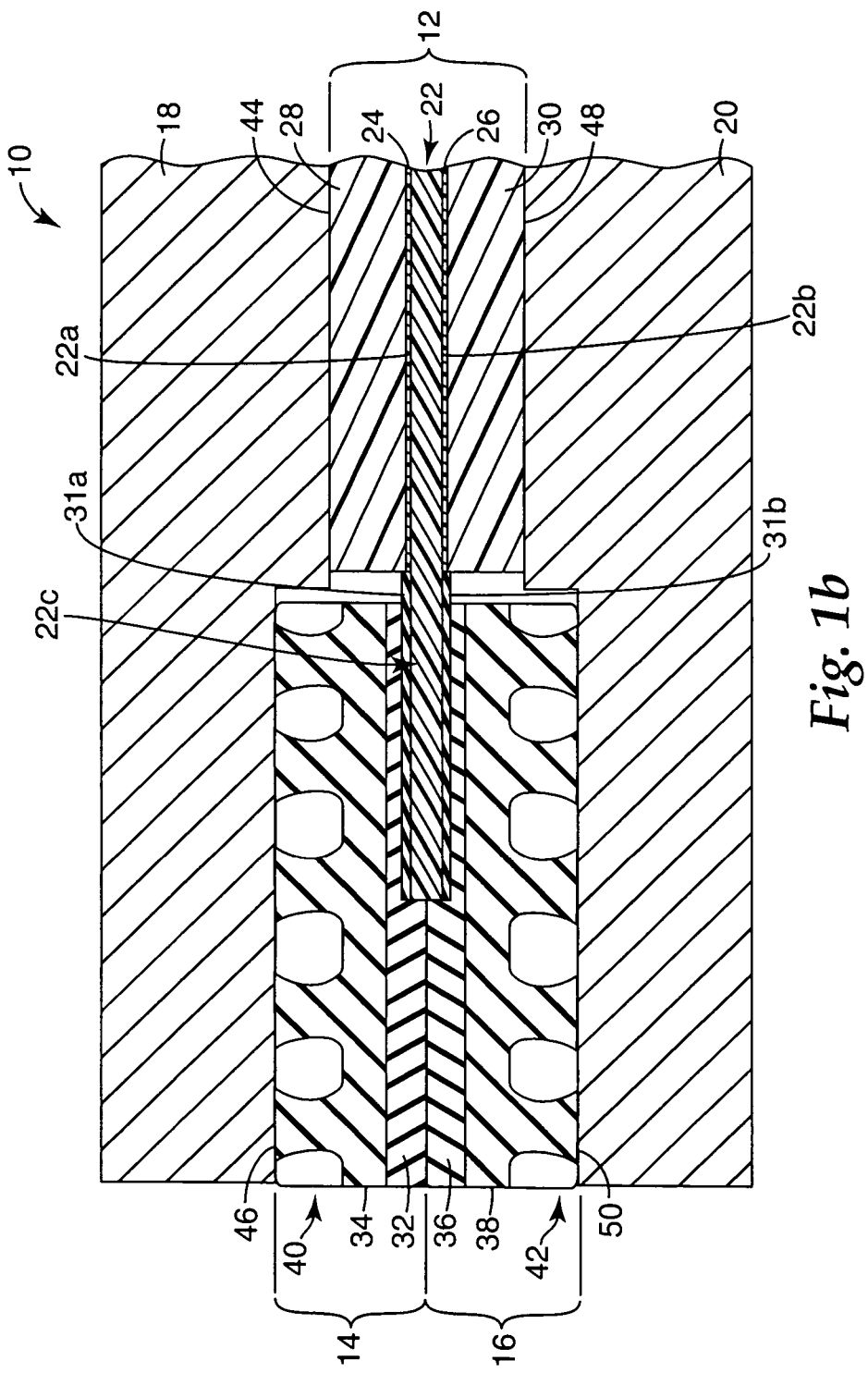
FIG. 1b is a sectional view of the peripheral portion of the electrochemical device subassembly of the present invention in a compressed state.

FIGS. 1a and 1b are sectional views of a peripheral portion of electrochemical device subassembly 10 of the present invention, where FIG. 1a depicts subassembly 10 in an uncompressed state during manufacturing, and FIG. 1b depicts subassembly 10 in a compressed state for use in an electrochemical device, such as a fuel cell. The peripheral portion of subassembly 10 shown in FIGS. 1a and 1b is representative of an entire periphery of subassembly 10.

As shown in FIG. 1a, subassembly 10 includes MEA 12, anode gasket 14, cathode gasket 16, anode electrode plate 18, and cathode electrode plate 20. MEA 12, anode gasket 14, and cathode gasket 16 are disposed between anode electrode plate 18 and cathode electrode plate 20. Anode gasket 14 and cathode gasket 16 face opposing directions in a back-to-back orientation, and are generally planar with MEA 12. As discussed below, when subassembly 10 is used in a fuel cell, anode electrode plate 18 and cathode electrode plate 20 are compressed together against MEA 12, anode gasket 14, and cathode gasket 16. The compression creates a first seal between anode gasket 14 and anode electrode plate 18, and a second seal between cathode gasket 16 and cathode electrode plate 20. The seals prevent pressurized gases from escaping subassembly 10 during operation.

MEA 12 is the portion of subassembly 10 that produces electricity during operation by separating fuel into hydrogen ions ($H^+$) and electrons ($e^-$). MEA 12 includes electrolyte membrane 22, anode catalyst layer 24, cathode catalyst layer 26, anode gas diffusion layer 28, cathode gas diffusion layer 30, and subgaskets 31a and 31b. Electrolyte membrane 22 includes first surface 22a and second surface 22b, which are opposing major surfaces, and peripheral edge 22c, which defines an outer perimeter of electrolyte membrane 22. Examples of suitable materials for electrolyte membrane 22 include acid-functional fluoropolymers, such as copolymers of tetrafluoroethylene and one or more fluorinated, acid-functional comonomers. Examples of suitable commercially available materials include fluoropolymers under the trade designations "NAFION" from DuPont Chemicals, Wilmington, Del.

Anode catalyst layer 24 is disposed adjacent first surface 22a, and cathode catalyst layer 26 is disposed adjacent second surface 22b. Examples of suitable materials for anode catalyst layer 24 and cathode catalyst layer 26 include carbon-supported catalyst particles, which include carbon particles and a catalyst metal, where the catalyst metal may include platinum and ruthenium for the anode catalyst layers and platinum for the cathode catalyst layers. The catalyst materials may also be applied to electrolyte membrane 22 as a catalyst ink, which includes the catalyst particles and electrolyte membrane materials dispersed in an aqueous or alcohol dispersion.

Anode gas diffusion layer 28 is disposed adjacent anode catalyst layer 24, opposite electrolyte membrane 22. Similarly, cathode gas diffusion layer 30 is disposed adjacent cathode catalyst layer 26, opposite electrolyte membrane 22. Anode gas diffusion layer 28 and cathode gas diffusion layer 30 may each be formed from any suitable electrically conductive porous substrate, such as carbon fiber constructions (e.g., woven and non-woven carbon fiber constructions), and may also be treated to increase or impart hydrophobic properties.

Subgaskets 31a and 31b are thin-layer gaskets for providing additional seal protection, and for strengthening electrolyte membrane 22 at peripheral portion 22c. As shown in FIG. 1a, subgasket 31a is secured to first surface 22a and subgasket 31b is secured to second surface 22b. While not shown in FIG. 1a, subgasket 31a may also partially extend between anode catalyst layer 24 and anode gas diffusion layer 28, and subgasket 31b may also partially extend between cathode catalyst layer 26 and cathode gas diffusion layer 30. This increases the seal between anode gas diffusion layer 28 and cathode gas diffusion layer 30 to prevent fuel and oxidant from mixing outside of MEA 12. Examples of suitable subgaskets for subgaskets 31a and 31b are disclosed in the pending U.S. patent application Ser. No. 10/961,263, U.S. patent application publication 2006/0078781, which is commonly assigned.

Examples of suitable thicknesses 12t of MEA 12 range from about 200 micrometers to about 1,000 micrometers, with particularly suitable thicknesses 12t of MEA 12 ranging from about 300 micrometers to about 500 micrometers. All thicknesses discussed herein refer to thicknesses in uncompressed states (i.e., where anode electrode plate 18 and cathode electrode plate 20 are not compressed together), and are taken in a direction along axis A in FIG. 1a.

Anode gasket 14 and cathode gasket 16 are respectively secured to subgaskets 31a and 31b at peripheral edge 22c of electrolyte membrane 22. This allows anode gasket 14 and cathode gasket 16 to seal the entire periphery of subassembly 10. Anode gasket 14 includes base layer 32 and elastomeric layer 34, and cathode gasket 16 includes base layer 36 and elastomeric layer 38. Anode gasket 14 and cathode gasket 16 may also include adhesive layers (not shown) disposed between the respective base layers and elastomeric layers for reducing the risk of interlayer delamination.

Base layers 32 and 36 are low-compression layers that may function as hard stops for strain control, limit the compressive forces applied to MEA 12, and provide for ease of handling of subassembly 10 during manufacturing. Elastomeric layers 34 and 38 are compressible layers that include replicated structures 40 and 42, respectively. Replicated structures 40 and 42 are shown from a sectional side view in FIG. 1a. If viewed from above, replicated structures 40 and 42 exhibit repeated patterns (e.g., hexagons) integrally formed from elastomeric layers 34 and 38. As discussed below the repeated-geometric patterns of replicated structures 40 and 42 increase the durability of seals formed by anode gasket 14 and cathode gasket 16.

As further shown in FIG. 1a, peripheral edge 22c of electrolyte membrane 22 is not co-extensive with anode gasket 14 and cathode gasket 16. As a result, anode gasket 14 and cathode gasket 16 extend beyond peripheral edge 22c, and are secured together beyond peripheral edge 22c. In particular, base layer 32 is secured to subgasket 31a at peripheral edge 22c and to base layer 36 beyond peripheral edge 22c. Similarly, base layer 36 is secured to subgasket 31b at peripheral edge 22c (and correspondingly to base layer 32 beyond peripheral edge 22c). Base layers 32 and 36 may also be secured together, and to subgaskets 31a and 31b, with adhesive layers (not shown).

Examples of suitable layer thicknesses 32t and 36t of base layers 32 and 36 range from about 20 micrometers to about 130 micrometers. Examples of suitable layer thicknesses 34t and 36t of elastomeric layers 34 and 38 (not including replicated structures 40 and 42) also range from about 20 micrometers to about 130 micrometers. Examples of suitable thicknesses 40t and 42t of replicated structures 40 and 42 each include thicknesses greater than about 250 micrometers, which are respectively taken from the surfaces of elastomeric layers 34 and 38. Examples of particularly suitable thicknesses 40t and 42t each range from greater than about 250 micrometers to about 2,000 micrometers, with even more particularly suitable thicknesses ranging from greater than about 250 micrometers to about 500 micrometers. Additionally, the sum of the thicknesses of anode gasket 14 and cathode gasket 16 (i.e., sum of thicknesses 32t, 34t, 36t, 38t, 40t, and 42t) is desirably at least about 20% greater than thickness 12t of MEA 12.

Anode electrode plate 18 and cathode electrode plate 20 are electrically-conductive electrode plates for fuel cells, which provide structural support to MEA 12. Anode electrode plate 18 includes contact surface 44 and recessed surface 46, and cathode electrode plate 20 includes contact surface 48 and recessed surface 50. Contact surface 44 is the portion of anode electrode plate 18 that compresses against anode gas diffusion layer 28 of MEA 12 and recessed surface 46 is the portion of anode electrode plate 18 that compresses against replicated structures 40 of anode gasket 14. Similarly, contact surface 48 is the portion of cathode electrode plate 20 that compresses against cathode gas diffusion layer 30 of MEA 12 and recessed surface 50 is the portion of cathode electrode plate 20 that compresses against replicated structures 42 of cathode gasket 16.

Recessed surfaces 46 and 50 are respectively offset from contact surfaces 44 and 48 to accommodate the dimensions of anode gasket 14 and cathode gasket 16. Recessed surface 46 is desirably offset from contact surface 44 such that the gap between replicated structures 40 and recessed surface 46 is less than the gap between anode gas diffusion layer 28 of MEA 12 and contact surface 44. Similarly, recessed surface 50 is also desirably offset from contact surface 48 such that the gap between replicated structures 42 and recessed surface 50 is desirably less than the gap between cathode gas diffusion layer 30 of MEA 12 and contact surface 48. This allows the seals to be formed before, or concurrently with, contact surfaces 44 and 48 reaching MEA 12. As a result, the amount of compression applied to MEA 12 may be minimized, thereby reducing the risk of over-compressing MEA 12.

Examples of suitable thicknesses 18*t* and 20*t* of anode electrode plate 18 and cathode electrode plate 20 each range from about 1,500 micrometers to about 2,100 micrometers. Examples of suitable offset distances 46*t* and 48*t* of recessed surfaces 46 and 48 from contact surfaces 44 and 48, each respectively range from about 50 micrometers to about 1,300 micrometers, with particularly suitable offset distances 46*t* and 48*t* ranging from about 100 micrometers to about 400 micrometers.

While subassembly 10 is illustrated as a symmetric component in FIG. 1*a*, one or more of thicknesses 32*t*-42*t* may alternatively differ from one another. For example, thicknesses 40*t* and 42*t* of replicated structures 40 and 42 may be different to modify the sealing patterns. Alternatively, recessed surfaces 46 and 50 may differ in the respective offsetting distances 46*t* and 50*t* from contact surfaces 44 and 48.

Anode electrode plate 18 and cathode electrode plate 20 each also include flow channels (not shown) for directing fuel and oxidant to MEA 12. In particular, anode electrode plate 18 provides a flow channel for supplying fuel to MEA 12, and cathode electrode plate 20 provides flow channels for supplying oxidant to MEA 12 and for removing water formed during the electrochemical reaction within MEA 12.

Anode electrode plate 18 and cathode electrode plate 20 may be unipolar plates or bipolar plates depending on the arrangement of the fuel cell. If the fuel cell is a single-cell body, anode electrode plate 18 and cathode electrode plate 20 are unipolar plates, where anode electrode plate 18 functions as the anode electrode and cathode electrode plate 20 functions as the cathode electrode. Alternatively, if the fuel cell is part of a stack of fuel cells, anode electrode plate 18 and cathode electrode plate 20 may be bipolar plates, where each plate functions as an anode electrode for a first fuel cell and a cathode electrode for an adjacent fuel cell. For example, anode electrode plate 18 may function as the anode electrode for a first fuel cell containing subassembly 10, and as a cathode electrode for a second fuel cell disposed adjacent the first fuel cell, opposite anode electrode plate 18.

Subassembly 10 may be assembled by positioning anode electrode plate 18 and cathode electrode plate 20 relative to MEA 12, anode gasket 14, and cathode gasket 16 as shown in FIG. 1*a*. Anode electrode plate 18 and cathode electrode plate 20 may then be compressed together. As anode electrode plate 18 compresses toward MEA 12 and anode gasket 14, replicated structures 40 contact recessed surface 46, and are compressed to form a first seal. Similarly, as cathode electrode plate 20 compresses toward MEA 12 and cathode gasket 16, replicated structures 42 contact recessed surface 50, and are compressed to form a second seal.

As shown in FIG. 1*b*, when anode electrode plate 18 and cathode electrode plate 20 reach MEA 12, seals are already formed between replicated structures 40 and 42 and recessed surfaces 48 and 50. Compression may continue until good electrical contact is made between MEA 12 and anode electrode plate 18 and cathode electrode plate 20, respectively. However, additional compression is not required for the purpose of forming seals.

During operation of a fuel cell containing subassembly 10, fuel (e.g., hydrogen gas) is introduced through the flow channels of anode electrode plate 18, and into anode gas diffusion layer 28. MEA 12 may alternatively use other fuel sources, such as methanol, ethanol, formic acid, and reformed gases. The fuel passes through anode gas diffusion layer 28 and over anode catalyst layer 24. At anode catalyst layer 24, the fuel is separated into hydrogen ions and electrons. Electrolyte membrane 22 only permits the hydrogen ions to pass through to reach cathode catalyst layer 26 and cathode gas diffusion layer 30. The electrons cannot pass through electrolyte membrane 22. As such, the electrons flow through an external circuit (not shown) between anode electrode plate 18 to cathode electrode plate 20 in the form of electric current. This current can power an electric load, such as an electric motor, or be directed to an energy storage device, such as a rechargeable battery. Oxidant (e.g., oxygen gas) is introduced through the flow channels of cathode electrode plate 20, and into cathode gas diffusion layer 30. The oxidant passes through cathode gas diffusion layer 30 and over cathode catalyst layer 26. At cathode catalyst layer 26, the oxidant, hydrogen ions, and electrons combine to produce water and heat. The resulting water may then exit the fuel cell through another flow channel in cathode electrode plate 20. Furthermore, the seals provided by anode gasket 14 and cathode gasket 16 prevent the pressurized fuel and oxidant from escaping subassembly 10.

In an alternative embodiment to subassembly 10, peripheral edge 22*c* of electrolyte membrane 22 is coextensive with the anode gasket 14 and cathode gasket 16. As a result, base layers 32 and 36 are substantially secured to peripheral edge 22*c*. In a second alternative embodiment, anode gasket 14 and cathode gasket 16 may be formed without base layers 32 and 36. This reduces costs for manufacturing anode gasket 14 and cathode gasket 16. In a third alternative embodiment, anode electrode plate 18 and cathode electrode plate 20 may be standard electrode plates that do not contain recessed surfaces 46 and 50. This embodiment applies higher compression forces to anode gasket 14 and cathode gasket 16 when anode electrode plate 18 and cathode electrode plate 20 compress together.

Figure 2A:
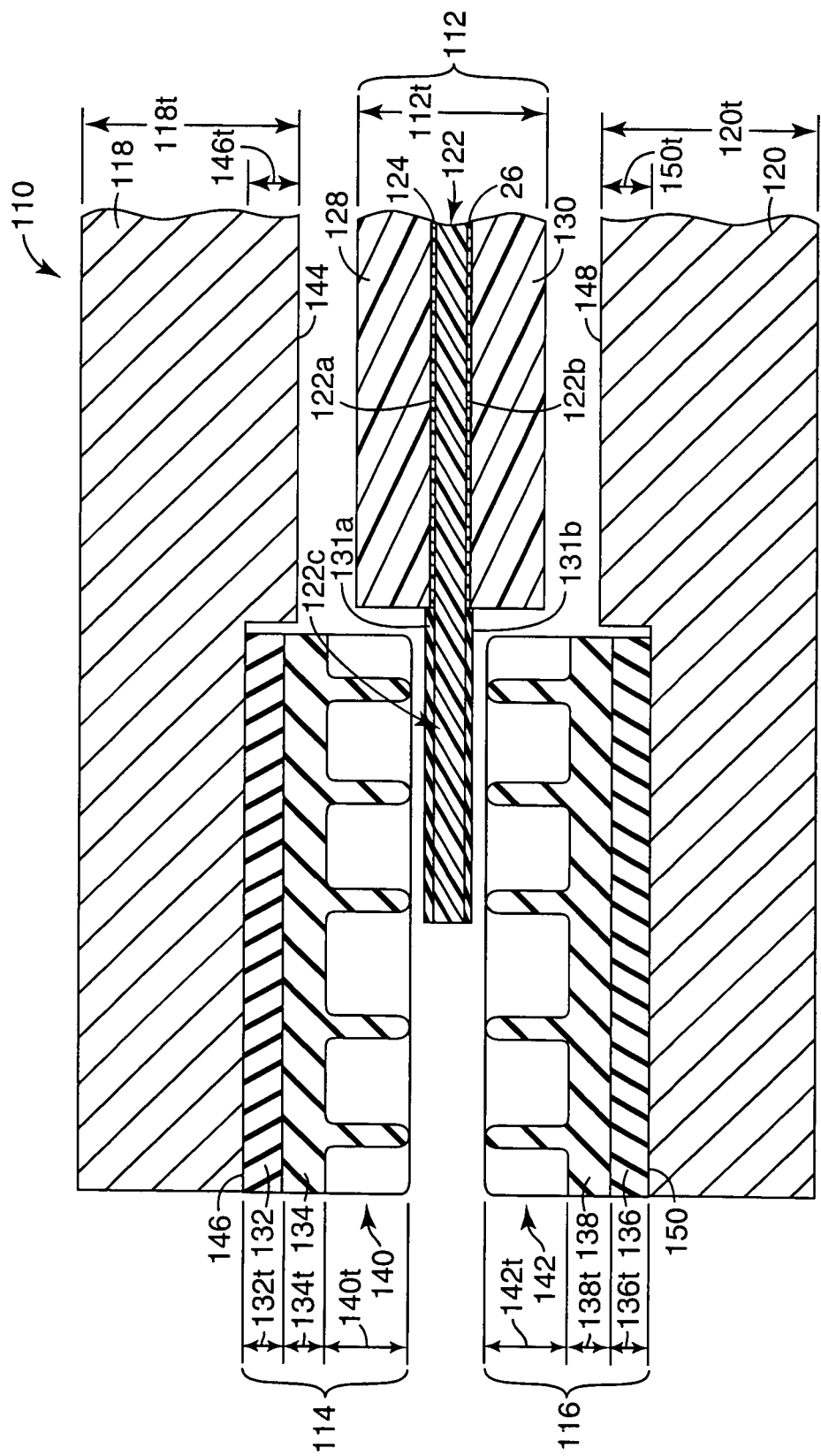
FIG. 2a is a sectional view of a peripheral portion of an alternative electrochemical device subassembly of the present invention in an uncompressed state.
Figure 2B:
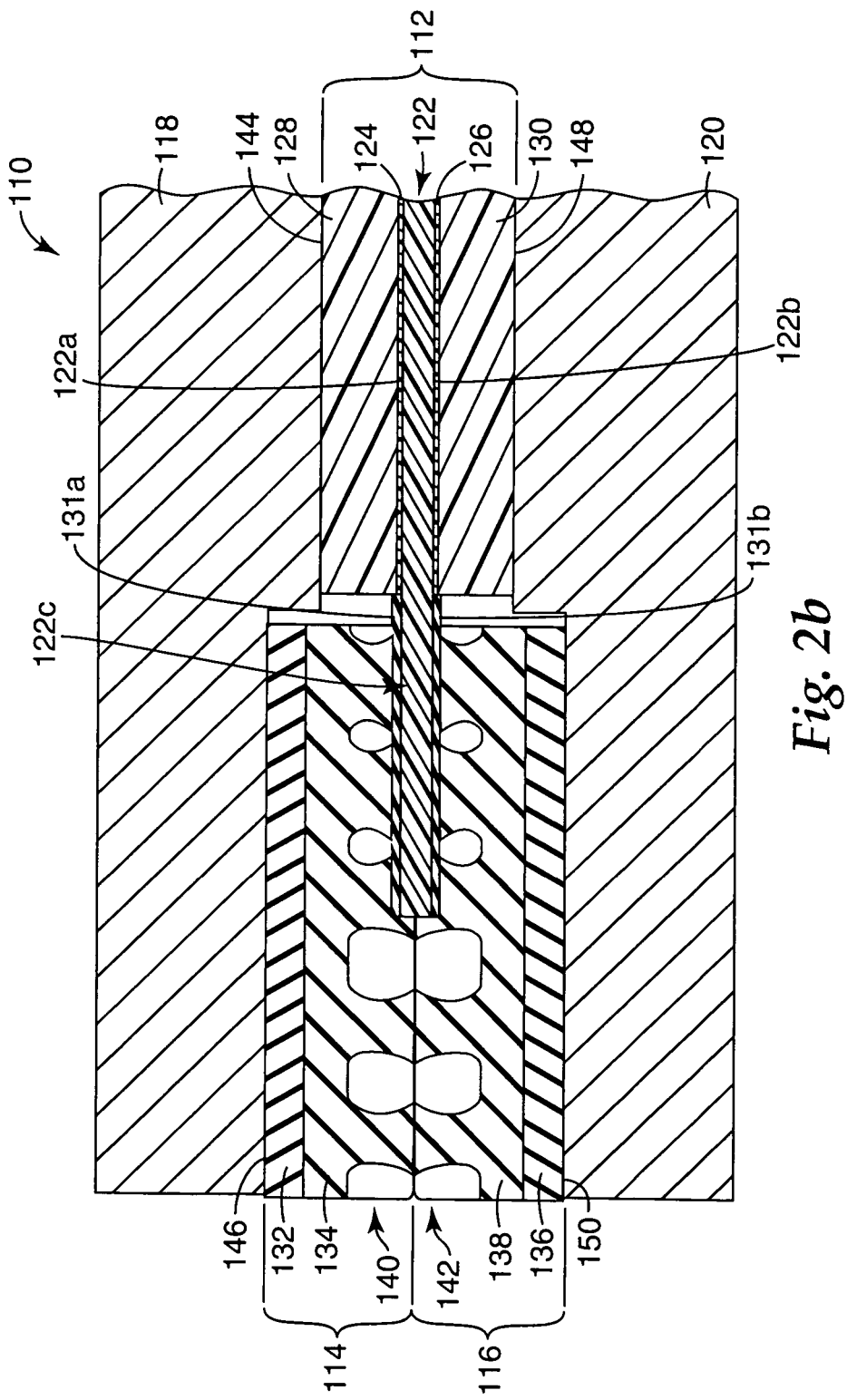
FIG. 2b is a sectional view of the peripheral portion of the alterative electrochemical device subassembly of the present invention in a compressed state.

FIGS. 2*a* and 2*b* are sectional views of a peripheral portion of electrochemical device subassembly 110, which is an alternative subassembly of the present invention. FIG. 2*a* depicts subassembly 110 in an uncompressed state during manufacturing, and FIG. 2*b* depicts subassembly 110 in a compressed state for use in an electrochemical device. As shown in FIG. 2*a*, subassembly 110 is similar to subassembly 10 (respective reference labels increased by 100), except that anode gasket 114 is secured to recessed surface 146 of anode electrode plate 118 and cathode gasket 116 is secured to recessed surface 150 of cathode electrode plate 120. This is in contrast to the back-to-back orientation shown of anode gasket 14 and cathode gasket 16 of subassembly 10. Anode gasket 114 and cathode gasket 116 may also be respectively secured to recessed surfaces 146 and 150 with adhesive layers (not shown). Anode gasket 114 and cathode gasket 116 provide seals for subassembly 110 and reduce the risk of over-compressing MEA 112 in the same manner as discussed above for anode gasket 14 and cathode gasket 16 in FIGS. 1*a* and 1*b*.

Subassembly 110 may be assembled by compressing anode electrode plate 118 and cathode electrode plate 120 together. As anode electrode plate 118 compresses toward MEA 112, replicated structures 140 contact subgasket 131*a* at peripheral edge 122c of electrolyte membrane 122. This compresses and deforms replicated structures 140 at peripheral edge 122c. Similarly, as cathode electrode plate 120 compresses toward MEA 112, replicated structures 142 contact subgasket 131b at peripheral edge 122c of electrolyte membrane 122. This compresses and deforms replicated structures 142 at peripheral edge 122c. Furthermore, replicated structures 140 also contact replicated structures 142 beyond peripheral edge 122c, which compress and deform these portions of replicated structures 140 and 142. This forms a seal between replicated structures 140 and 142 to prevent pressurized gases from escaping subassembly 110.

As shown in FIG. 2b, when anode electrode plate 118 and cathode electrode plate 120 contact MEA 112, a seal is already formed between replicated structures 140 and 142. Compression may continue until good contact is made between MEA 112 and anode electrode plate 118 and cathode electrode plate 120, respectively. However, additional compression is not required for the purpose of forming a seal. Subassembly 110 may then be used in a fuel cell in the same manner as discussed above in FIG. 1b.

Figure 3A:
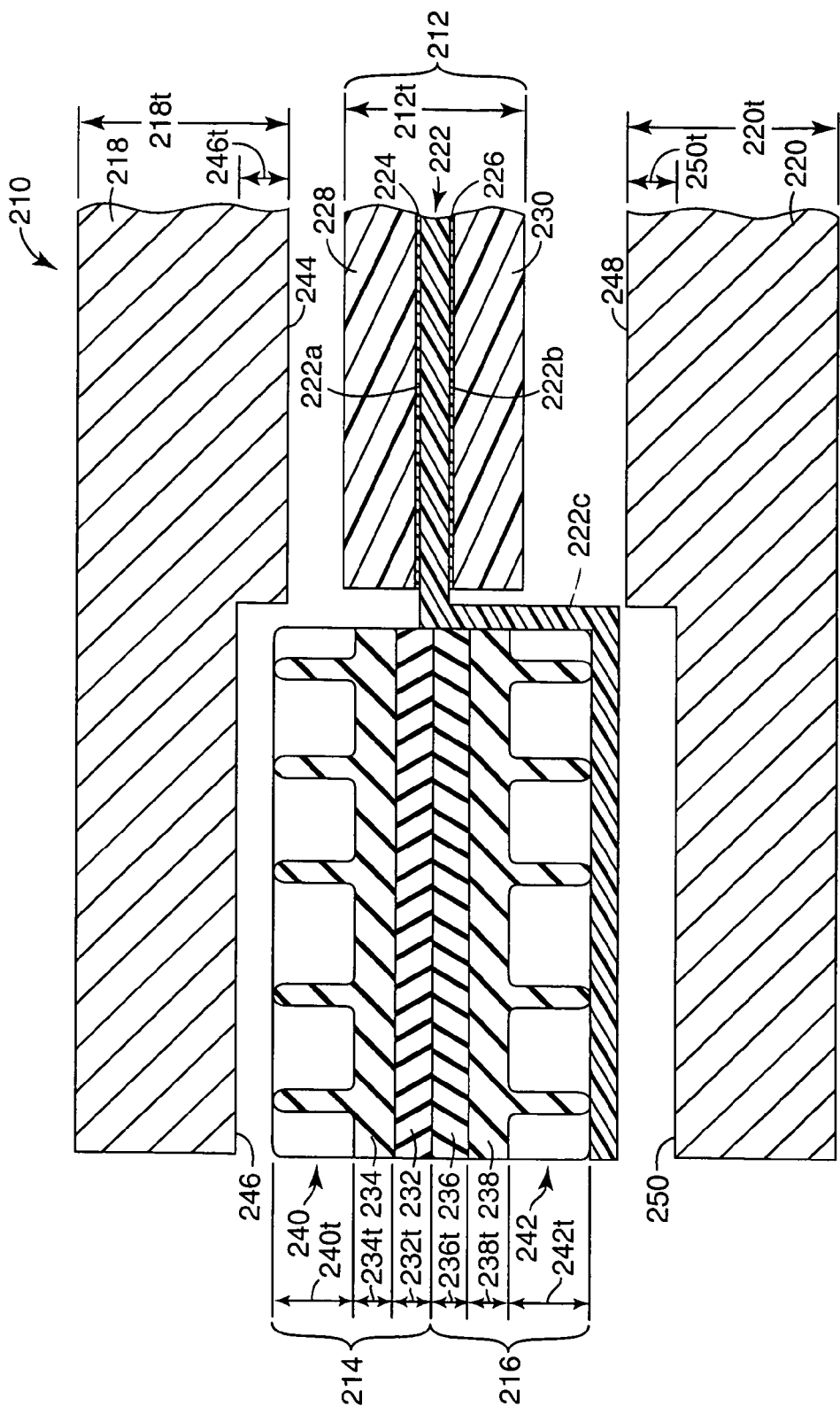
FIG. 3a is a sectional view of a peripheral portion of a second alternative electrochemical device subassembly of the present invention in an uncompressed state.
Figure 3B:
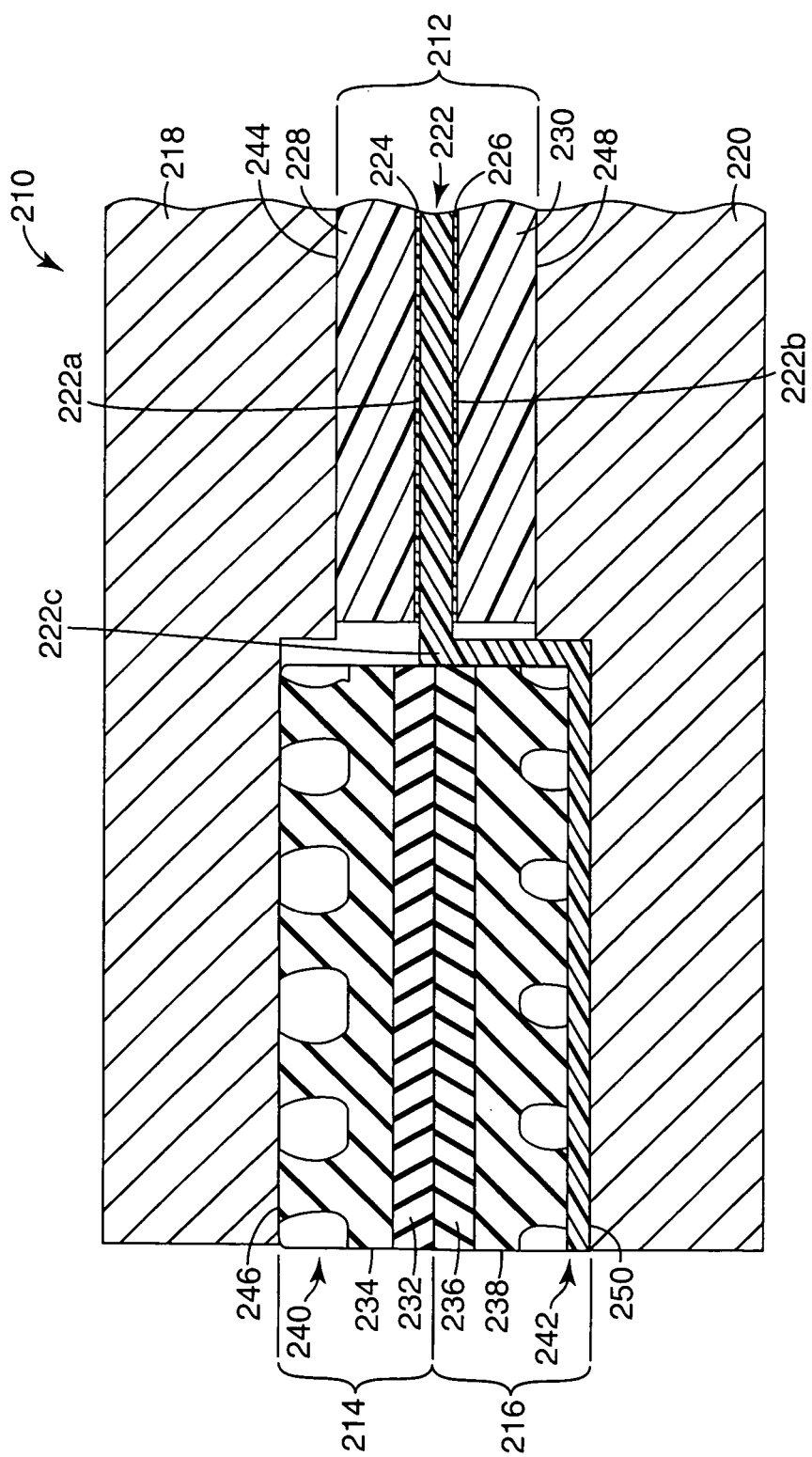
FIG. 3b is a sectional view of the peripheral portion of the second alterative electrochemical device subassembly of the present invention in a compressed state.

FIGS. 3a and 3b are sectional views of a peripheral portion of electrochemical device subassembly 210, which is another alternative subassembly of the present invention. FIG. 3a depicts subassembly 210 in an uncompressed state during manufacturing, and FIG. 3b depicts subassembly 210 in a compressed state for use in an electrochemical device. As shown in FIG. 3a, subassembly 210 is also similar to subassembly 10 (respective reference labels increased by 200), except that anode gasket 214 and cathode gasket 216 are not secured to electrolyte membrane 222. Instead, peripheral edge 222c of electrolyte membrane 222 is bent to extend between cathode gasket 216 and cathode electrode plate 220. This arrangement allows peripheral edge 222c to continue to function as a barrier between the fuel and oxidant introduced into MEA 212. In this embodiment, anode gasket 214 and cathode gasket 216 provide seals for subassembly 210, and also reduce the risk of over-compressing MEA 212 in a similar manner to that discussed above for anode gasket 14 and cathode gasket 16 in FIGS. 1a and 1b. In an alternative arrangement, peripheral edge 222c may extend between anode gasket 214 and anode electrode plate 218. Additionally, peripheral edge 222c may also be disposed between a pair of subgaskets similar to subgaskets 31a and 3b discussed above in FIG. 1a.

Subassembly 210 may be assembled by positioning anode gasket 214 and cathode gasket 216 between recessed surfaces 246 and 248, such that anode gasket 214 and cathode gasket 216 are disposed adjacent peripheral edge 222c of electrolyte membrane 222, as shown in FIG. 3a. This embodiment is advantageous because anode gasket 214 and cathode gasket 216 are not required to be connected to electrolyte membrane 222, which reduces the time required to manufacture subassembly 210. After anode gasket 214 and cathode gasket 216 are inserted, anode electrode plate 218 and cathode electrode plate 220 may be compressed together, which compresses and deforms replicated structures 240 and 242 to form seals in a similar manner to that discussed above for replicated structures 40 and 42 in FIGS. 1a and 1b. Additionally, the compression retains anode gasket 214 and cathode gasket 216 between anode electrode plate 218 and cathode electrode plate 220.

As shown in FIG. 3b, when anode electrode plate 218 and cathode electrode plate 220 contact MEA 212, seals are already formed between peripheral edge 222c of electrolyte membrane 222, replicated structures 240 and 242, and recessed surfaces 248 and 250. Compression may continue until good electrical contact is made between MEA 212 and anode electrode plate 218 and cathode electrode plate 220, respectively. However, additional compression is not required for the purpose of forming seals. Subassembly 210 may then be used in a fuel cell in the same manner as discussed above in FIG. 1b.

In an alternative embodiment to subassembly 210, anode gasket 214 and cathode gasket 216 may be formed without base layers 232 or 236. In this embodiment, anode gasket 214 and cathode gasket 216 may respectively include only elastomeric layers 34 and 38, where elastomeric layers 34 and 38 exhibit thicknesses that account for the absence of base layers 232 and 236. Additionally, anode gasket 214 and cathode gasket 216 may be formed as a single elastomeric layer with replicated structures 240 and 242 extending from opposing surfaces. Furthermore, peripheral edge 222c of electrolyte membrane 222 may alternatively extend less than the entire area between cathode gasket 216 and recessed surface 250 (i.e., not coextensive with cathode gasket 216). This allows a portion of cathode gasket 250 to be compressed directly against recessed surface 250 to form a seal.

Figure 4A:
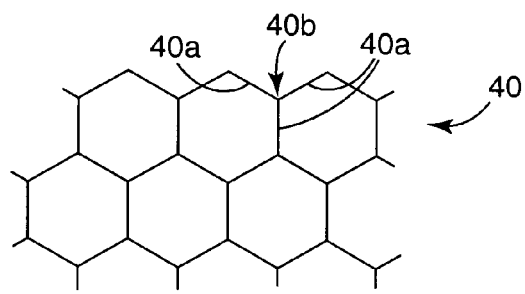
FIGS. 4a-4d are top view illustrations of replicated structures suitable for use in gaskets of the electrochemical device subassemblies of the present invention.
Figure 4B:
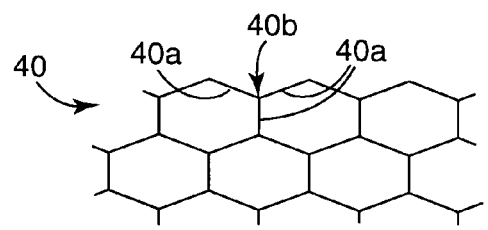
Figure 4C:
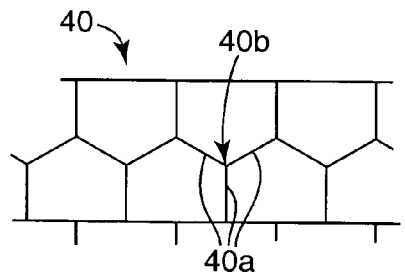
Figure 4D:
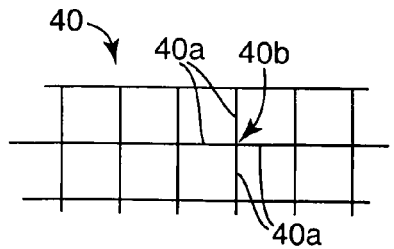

FIGS. 4a-4d are top view illustrations of different repeated-geometric patterns for replicated structures 40. While the repeated patterns shown in FIGS. 4a-4d refer to replicated structures 40, the repeated patterns are applicable to all embodiments of the present invention (e.g., replicated structures 40, 42, 140, 142, 240, and 242). FIGS. 4a and 4b show replicated structures 40 as repeated-hexagonal patterns, FIG. 4c shows replicated structures 40 as a repeated-heptagonal pattern, and FIG. 4d shows replicated structures 40 as a repeated-square pattern. Replicated structures 40 may also include combinations of different repeated patterns.

As shown in FIGS. 4a-4d, replicated structures 40 include walls 40a (the portions of replicated structures 40 viewable in FIGS. 1a and 1b) and intersections 40b where walls 40a meet. In addition to the suitable dimensions discussed above, replicated structures 40 desirably include repeated patterns where no more than three or four walls 40a meet at any given intersection 40b. This increases compressibility and deformability, and distributes applied pressure to preserve the durability of replicated structures 40. Examples of suitable center-to-center distances of the repeated patterns of replicated structures 40 range from about 1,200 micrometers to about 3,200 micrometers. Examples of suitable thicknesses for each of walls 40a range from about 250 micrometers to about 500 micrometers.

Replicated structures 40 are also beneficial when holes are cut into the corresponding gaskets (e.g., anode gasket 14 and cathode gasket 16). Holes may be cut in gaskets to accommodate various components of fuel cells. When holes are cut in conventional gaskets, o-rings are typically disposed around the holes to prevent leaks in the seals. However, when holes are cut in replicated structures 40, o-rings are not required because walls 40a around the cut hole automatically provide an effective seal against leaking. This reduces time and effort required to manufacture subassembly 10 of the present invention. To preserve effective sealing, the gaskets of subassembly 10 desirably include from about one to about ten repeated patterns between any two openings and/or edges of the corresponding gasket. Even more desirably, the gaskets include from about two to about five repeated patterns between any two openings and/or edges of the corresponding gasket.

Examples of suitable materials for the elastomeric layers include elastomeric materials, such as rubbers, silicone elastomers, thermoplastic elastomers, thermoset elastomers, elastomeric adhesives, styrene-containing diblock and triblock copolymers, and combinations thereof. An example of a suitable combination of materials includes about 60% by weight of a melt processible thermoplastic elastomer commercially available under the trade designation "SANTOPRENE 101-64" from Advanced Elastomer Systems, Akron, Ohio, and about 40% by weight of a linear styrene-isoprene-styrene triblock copolymer commercially available under the trade designation "VECTOR 4211" from Dexco Polymers, Houston, Tex.

As discussed above, the base layers have lower compressibilities compared to the elastomeric layers. The term "compressibility" herein refers to the amount of deformation a material exhibits when subjected to an applied pressure. Examples of suitable materials for the base layers include polyolefins (e.g., polypropylene and polyethylene), polyethylene terephthalate, polyethylene naphthalate, and combinations thereof. The suitable materials provide low-compressibilities for the base layers such that the base layers may function as hard stops for strain control during manufacturing. The low-compressibilities also provide for better handling of the gaskets prior to assembly.

Gaskets suitable for use in the present invention (e.g., anode gasket 14) may be formed by fabricating a gasket film that includes an elastomeric layer (e.g., elastomeric layer 34), a base layer (e.g., base layer 32), and optionally an adhesive layer between the elastomeric layer and the base layer. The gasket film may be fabricated in a variety of manners, such as extrusion, drop casting, calendering, coating, and combinations thereof. For example, in one embodiment, the gasket film may be fabricated by co-extruding materials to form the base layer and the elastomeric layer. Replicated structures (e.g., replicated structures 40) may then be formed in the elastomeric layer, which may be performed by compression molding, injection molding, embossing, and combinations thereof. In an alternative embodiment, replicated structures may be formed in the elastomeric layer prior to securing the elastomeric layer to the base layer. In this embodiment, the elastomeric layer containing the replicated structures may be subsequently laminated to the base layer to form the gasket film.

After fabrication, the gasket film may be cut or otherwise separated into individual gaskets (e.g., anode gasket 14 and cathode gasket 16). The gaskets may then be connected to a peripheral edge of an electrolyte membrane (e.g., peripheral edge 22c). This may be performed by connecting the base layers of the gasket films to the opposing surfaces of the electrolyte membrane at the peripheral edge of the electrolyte membrane. Alternatively, as discussed above in FIGS. 1a-2b, the base layers of the gaskets films may be connected to subgaskets (e.g., subgaskets 31a and 31b), which are correspondingly secured to the films to the opposing surfaces of the electrolyte membrane at the peripheral edge of the electrolyte membrane. The resulting subassembly may then be compressed to form a seal, as discussed above.

Figure 5:
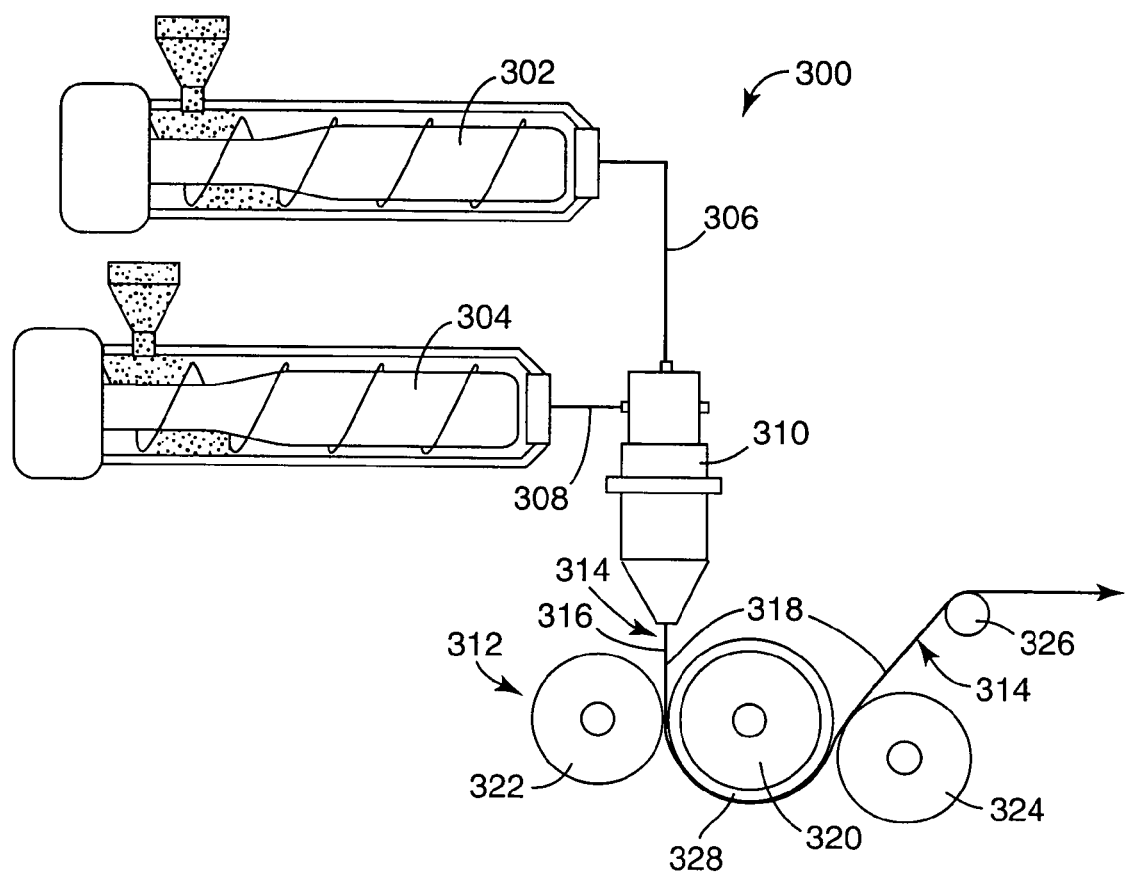
FIG. 5 is an illustration of a suitable extrusion system for forming a gasket film for use in electrochemical device subassemblies of the present invention.

FIG. 5 is an illustration of extrusion system 300, which is a suitable system for forming gaskets (e.g., anode gasket 14) in a continuous process. Extrusion system 300 includes extruders 302 and 304, neck tubes 306 and 308, feedblock 310, and roller system 312. Extruders 302 and 304 are single-screw extruders (e.g., 1.25-inch or 1.5 inch diameter extruders from Davis-Standard Corporation) for melting and coextruding the materials for the elastomeric layer and the base layer. Neck tubes 306 and 308 respectively connect extruders 302 and 304 to feedblock 310.

Extruder 302 melts and extrudes materials for the elastomeric layer through neck tube 306, and into feedblock 310. Similarly, extruder 304 melts and extrudes materials for the base layer through neck tube 308, and into feedblock 310. Feedblock 310 orients the received materials and produces gasket film 314, which includes base layer 316 and elastomeric layer 318. Gasket film 314 may then be drop cast into roller system 312. In an alternative embodiment, extrusion system 300 may only include extruder 302 for extruding elastomeric layer 318. In this embodiment, base layer 316 may be provided in film form, and may be laminated to elastomeric layer 318 prior to entering roller system 312.

Roller system 312 includes cast roller 320, nip rollers 322 and 324, and idle roller 326. Cast roller 320 includes patterned sleeve 328, which is disposed around the annular surface of cast roller 320. Patterned sleeve 328 may be a tooled metal sleeve or a solid polymer film (e.g., polyurethane) that contains a replicated pattern that is the negative of the replicated structures of the elastomeric layers (e.g., replicated structures 40 and 42). Nip rollers 322 and 324 are smooth rollers disposed adjacent cast roller 320 to apply a pressure against gasket film 314 (e.g., about 100 pounds/linear inch to about 400 pounds/linear inch). Gasket film 314 is oriented such that elastomeric layer 318 faces cast roller 320 and base layer 316 faces nip roller 322.

As gasket film 314 drops between cast roller 320 and nip roller 322, nip roller 322 presses gasket film 314 against patterned sleeve 328 of cast roller 320. Portions of elastomeric layer 318 are forced in the replicated patterns of patterned sleeve 328, which form the replicated structures in elastomeric layer 318. Cast roller 320 and nip rollers 322 and 324 are desirably maintained at an elevated temperature (e.g., about 65° C.) to assist in the formation of the replicated structures. Gasket film 314 disengages from patterned sleeve 328 after passing between cast roller 320 and nip roller 324. The resulting gasket film 314 with the replicated structures may then pass over idler roller 326 and be wound on a spool. Gasket film 314 may then be separated into separate gaskets and connected to electrolyte membranes to provide durable seals in the electrochemical device subassemblies discussed above.

Figure 6:
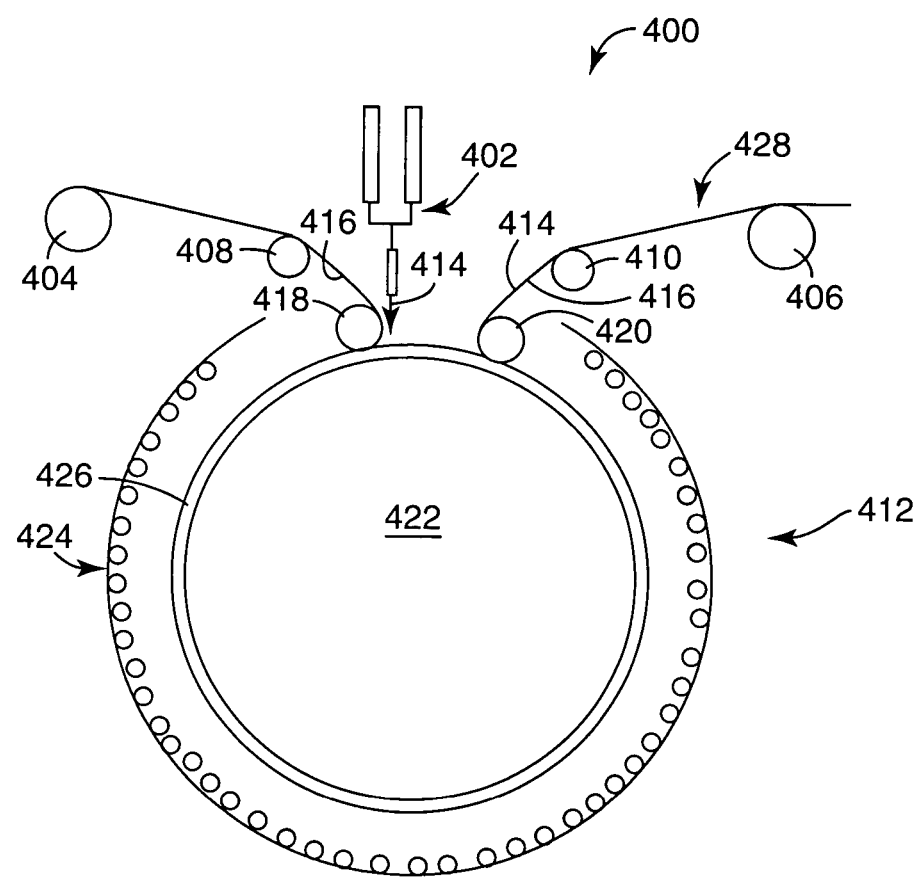
FIG. 6 is an illustration of a suitable coating system for forming a gasket film for use in electrochemical device subassemblies of the present invention While the above-identified drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale. Like reference numbers have been used throughout the figures to denote like parts.

FIG. 6 is an illustration of coating system 400, which is another suitable system for forming gaskets (e.g., anode gasket 14) in a continuous process. Coating system 400 includes two-component dispenser 402, feed spool 404, receiving spool 406, idle rollers 408 and 410, and wheel system 412. Two-component dispenser 402 is a dispenser and static mixer suitable for combining two-part materials, such as silicone elastomers, for forming elastomeric layer 414. Feed spool 404 is a feed source for film of base layer 416. The film of base layer 416 may be unwound from feed spool 404 and passed over idle roller 408 to meet with the material of elastomeric layer 414 at wheel system 412.

Wheel system 412 includes nip rollers 418 and 420, drum wheel 422, and heat lamp system 424. Nip rollers 418 and 420 are smooth rollers disposed adjacent drum wheel 422 to apply a pressure against elastomeric layer 414 and base layer 416 (e.g., about 20 pounds/linear inch). Drum wheel 422 includes patterned sleeve 426, which is disposed around the annular surface of drum wheel 422. Patterned sleeve 426 may be a tooled metal sleeve or a solid polymer film (e.g., polyurethane) that contains a replicated pattern that is the negative of the replicated structures of the elastomeric layers (e.g., replicated structures 40 and 42). Heat lamp system 424 is a ring of heat sources that extend around the annular surface of drum wheel 422 and apply heat radially inward toward drum wheel 422. For example, heat lamp system 424 may be a ring of infrared lamps for maintaining a temperature of about 70° C. in the vicinity of drum wheel 422.

In the embodiment shown in FIG. 6, drum wheel 422 mechanically rotates in a counter-clockwise direction. This causes the material of elastomeric layer 414 deposited on drum wheel 422 from two-component dispenser 402 to be forced between nip roller 418 and drum wheel 422. Similarly, the film of base layer 416 extends around nip roller 418 in a clock-wise direction, thereby also being forced between nip roller 418 and drum wheel 422. As a result, the material of elastomeric layer 414 is laminated against the film of base layer 416, where the material of elastomeric layer 414 faces patterned sleeve 426 of drum wheel 422, and the film of base layer 416 faces nip roller 418.

As the material of elastomeric layer 414 and the film of base layer 416 pass between nip roller 418 and drum wheel 422, nip roller 418 presses the material of elastomeric layer 414 against patterned sleeve 426 of drum wheel 422. Portions of the material of elastomeric layer 414 are forced in the replicated patterns of patterned sleeve 426, which form the replicated structures in elastomeric layer 414. As the material of elastomeric layer 414 and the film of base layer 416 rotate around drum wheel 422, heat lamp system 424 cures the material of elastomeric layer 414. This forms gasket film 428 having elastomeric layer 414 (with replicated patterns) laminated on base layer 416.

After rotating around drum wheel 422, gasket film 428 disengages from patterned sleeve 426 after passing between nip roller 420 and drum wheel 422. The resulting gasket film 428 with the replicated structures may then pass over idler roller 410 and be wound on receiving spool 406. Gasket film 428 may then be separated into separate gaskets and connected to electrolyte membranes to provide durable seals in the electrochemical device subassemblies discussed above.

While the continuous processes discussed above in FIGS. 5 and 6 are shown as suitable methods for forming gasket films for use in subassemblies of the present invention (e.g., subassembly 10), the continuous processes are also suitable for forming gasket films disclosed in Wald et al., U.S. Patent Application Publication No. 2003/0211378, which is commonly assigned.

Although the present invention has been described with reference to preferred embodiments, workers skilled in the art will recognize that changes may be made in form and detail without departing from the spirit and scope of the invention.

The invention claimed is:

1. An electrochemical device subassembly comprising:
   a membrane electrode assembly including an electrolyte membrane having a first major surface, a second major surface opposite the first major surface, and a peripheral edge; and
   a first gasket disposed adjacent the first major surface of the electrolyte membrane at the peripheral edge, the first gasket having a first gasket surface and a plurality of first replicated structures, the first replicated structures extending greater than about 250 micrometers from the first gasket surface.

2. The electrochemical device subassembly of claim 1, wherein the first gasket comprises a base layer and an elastomeric layer, wherein the elastomeric layer is connected to the base layer, wherein the elastomeric layer includes the first gasket surface and the plurality of first replicated structures, and wherein the base layer has a lower compressibility than the elastomeric layer.

3. The electrochemical device subassembly of claim 2, wherein the base layer is selected from the group consisting of polyethylene terephthalate, polyethylene naphthalate, polypropylene, polyethylene, polycarbonate, polyimide, and combinations thereof.

4. The electrochemical device subassembly of claim 2, wherein the first gasket further comprises an adhesive layer.

5. The electrochemical device subassembly of claim 1, wherein the first gasket is connected to the first major surface of the electrolyte membrane at the peripheral edge.

6. The electrochemical device subassembly of claim 1, further comprising a second gasket disposed adjacent the second major surface of the electrolyte membrane at the peripheral edge, the second gasket having a second gasket surface and a plurality of second replicated structures, the second replicated structures extending greater than about 250 micrometers from the second gasket surface.

7. The electrochemical device subassembly of claim 6, further comprising a first electrode plate and a second electrode plate, wherein the first electrode plate is disposed adjacent the first gasket and the second electrode plate is disposed adjacent the second gasket.

8. An electrochemical device subassembly comprising:
   a membrane electrode assembly having a first uncompressed-state thickness, the membrane electrode assembly comprising:
      an electrolyte membrane having a first major surface, a second major surface opposite the first major surface, and a peripheral edge;
      an anode catalyst layer disposed adjacent the first major surface of the electrolyte membrane;
      a cathode catalyst layer disposed adjacent the second major surface of the electrolyte membrane;
      an anode gas diffusion layer disposed adjacent the anode catalyst layer, opposite the electrolyte membrane; and
      a cathode gas diffusion layer disposed adjacent the cathode catalyst layer, opposite the electrolyte membrane;
   a first gasket disposed adjacent the first major surface of the electrolyte membrane at the peripheral edge, the first gasket having a first replicated structure and a second uncompressed-state thickness; and
   a second gasket disposed adjacent the second major surface of the electrolyte membrane at the peripheral edge, the second gasket having a second replicated structure and a third uncompressed-state thickness, wherein a sum of the second uncompressed-state thickness and the third uncompressed-state thickness is at least about 20% greater than the first uncompressed-state thickness.

9. The electrochemical device subassembly of claim 8, wherein the first gasket has a first gasket surface and the first replicated structure extends greater than about 250 micrometers from the first gasket surface.

10. The electrochemical device subassembly of claim 8, wherein the first gasket comprises a base layer and an elastomeric layer connected to the base layer, wherein the elastomeric layer includes the first gasket surface and the first replicated structure, and wherein the base layer has a lower compressibility than the elastomeric layer.

11. The electrochemical device subassembly of claim 10, wherein the base layer is selected from the group consisting of polyethylene terephthalate, polyethylene naphthalate, polypropylene, polyethylene, polycarbonate, polyimide, and combinations thereof.

12. The electrochemical device subassembly of claim 8, further comprising a first electrode plate and a second electrode plate, wherein the first electrode plate is disposed adjacent the first gasket and the anode gas diffusion layer, and the second electrode plate is disposed adjacent the second gasket and the cathode gas diffusion layer.

13. The electrochemical device subassembly of claim 12, wherein the first electrode plate has a first recessed surface adjacent the first gasket and the second electrode plate has a second recessed surface adjacent the second gasket.

14. The electrochemical device subassembly of claim 8, wherein the first gasket is connected to the first major surface of the electrolyte membrane at the peripheral edge, and wherein the second gasket is connected to the second major surface of the electrolyte membrane at the peripheral edge.

\* \* \* \* \*